United States Patent [19]

Angevine et al.

[11] Patent Number: 4,568,448

[45] Date of Patent: Feb. 4, 1986

[54] HYDRODESULFURIZATION PROCESS EMPLOYING POISON-RESISTANT CATALYST

[75] Inventors: Philip J. Angevine, West Deptford; Edward J. Rosinski, Pedricktown, both of N.J.

[73] Assignee: Mobil Oil Corporation, New York, N.Y.

[21] Appl. No.: 666,230

[22] Filed: Jun. 14, 1982

Related U.S. Application Data

[62] Division of Ser. No. 210,492, Nov. 26, 1980.

[51] Int. Cl.$^4$ ............................................. C10G 25/05
[52] U.S. Cl. .................................. 208/213; 208/216 R
[58] Field of Search .............. 208/213, 216 R, 251 H, 208/111, 120

[56] References Cited

U.S. PATENT DOCUMENTS

| | | | |
|---|---|---|---|
| 2,813,837 | 11/1957 | Holden | 502/314 X |
| 3,956,186 | 5/1976 | Iwase et al. | 502/302 X |
| 4,062,811 | 12/1977 | Hargrove | 502/302 |
| 4,088,605 | 5/1978 | Rollmann | 502/69 |
| 4,317,746 | 3/1982 | Richardson | 502/211 |
| 4,376,041 | 3/1983 | Richardson | 208/215 |
| 4,378,308 | 3/1983 | Angevine et al. | 208/213 X |
| 4,394,251 | 7/1983 | Miller | 208/111 |

Primary Examiner—D. E. Gantz
Assistant Examiner—Glenn A. Caldarola
Attorney, Agent, or Firm—Alexander J. McKillop; Michael G. Gilman; Charles J. Speciale

[57] ABSTRACT

Metal poisoning of hydrodesulfurization catalysts is reduced by coating the catalyst surface with a hydrated clay mineral, hydrated alumina, hydrated silica, or mixtures thereof. The catalyst and process in which it is used are particularly useful for the desulfurization of residual oils to produce low-sulfur, fuel oil products.

7 Claims, 1 Drawing Figure

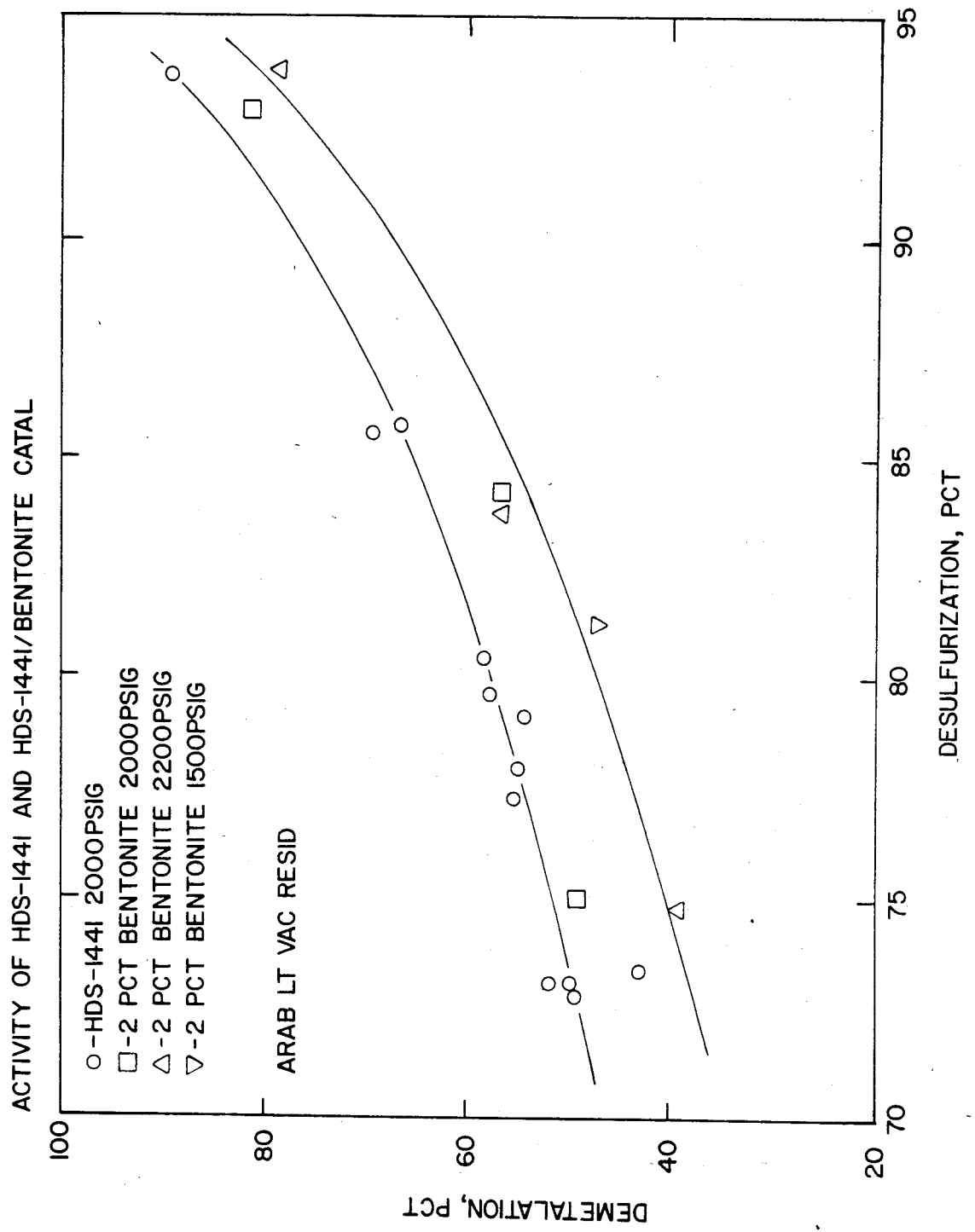

HYDRODESULFURIZATION PROCESS EMPLOYING POISON-RESISTANT CATALYST

This is a division of copending application Ser. No. 210,492, filed Nov. 26, 1980.

BACKGROUND OF THE INVENTION

1. Field of the Invention

This invention relates to hydrogenation catalysts and to a hydrotreating process for removing sulfur contaminants from hydrocarbon feedstocks. More particularly, this invention relates to a novel catalytic material useful for the hydrodesulfurization of hydrocarbons, preferably petroleum oils containing residual hydrocarbon components and having a significant metals content, and to hydrotreating processes employing such catalysts.

2. Description of the Prior Art

The current trend in refinery crude slates is for the utilization of increasingly heavy and "dirty" feedstocks, which contain large amounts of sulfur, nitrogen, metals, etc. In addition, an increasing proportion of these crude oils is present as residual fuels, and the principal outlet for these fuels is as low sulfur fuel oils subsequent to catalytic desulfurization. Because of the increasing problems of air pollution, particularly with regard to sulfur oxide emissions, increasing concern among refiners has arisen with respect to the utilization of these feedstocks. Consequently, the development of an efficient and economic means for sulfur removal from these heavy, sulfur-bearing oils has become a primary research goal in this industry.

Various methods for removal of sulfur from these feedstocks have been the subject of intensive research efforts by this industry. At present, the most practical means of desulfurizing such heavy oils is catalytic hydrogenation at elevated pressures and temperatures in the presence of an appropriate catalyst. While these methods are relatively efficient in the case of certain distillate oils, they become less efficient as increasingly heavy feedstocks, such as whole or topped crudes or residua, are processed.

Difficulty has been experienced in achieving an economically feasible catalytic hydrodesulfurization process because, notwithstanding the fact that the desulfurized products may have a wider marketability, the manufacturer may be able to charge little or no additional premium for the low sulfur products and hydrodesulfurization operating costs have tended to be relatively high in view of the previously experienced, relatively short life for catalysts used in hydrodesulfurization or residua-containing stocks. Short catalyst life is manifested by inability of a catalyst to maintain a relatively high capability for desulfurizing charge stocks with increasing quantities of coke and/or metallic contaminants which act as catalysts poisons. Satisfactory catalyst life can be obtained relatively easily with distillate oils but is especially difficult to obtain in desulfurizing petroleum oils containing residual components since the asphaltene or asphaltic components of an oil, which tend to form disproportionate amounts of coke, are concentrated in the residual fractions of a petroleum oil, and since a relatively high proportion of the metallic contaminants that normally tend to poison catalysts are commonly found in the asphaltene components of the oil.

The most common desulfurization catalyst is cobalt molybdate on a alumina base. However, any of the group VI and group VIII metals may be employed as a hydrogenation component on a suitable refractory base material. Typical operating condition ranges for resid and/or crude desulfurization are a temperature of about 650° to 850° F., a space velocity of about 0.1 to 5.0 LHSV, a pressure of about 500 to 3000 psig and a hydrogen circulation rate of about 1000 to about 15,000 scf/barrel of feed. This type of process has been operated in such a manner as to maintain a substantially constant conversion for level of sulfur removal. In order to achieve this desired level of sulfur removal, the operating conditions are steadily increased in severity to compensate for the gradual catalyst deactivation primarily due to metals poisoning and coking.

Process severity may be described as being directly related to temperature and pressure and inversely related to the space velocity of the process. Thus, in order to increase severity, one might increase pressure and/or temperature or decrease the space velocity. As most process units are sized based on throughput and pressure, neither the contact time nor the pressure can be significantly increased. Therefore, severity is typically increased through a temperature increase. Thus most residua desulfurization reactors are initially operated at a "start of run" temperature of about 650° F. to 750° F. As the desulfurization catalyst activity decreases due to metals deposition and coke formation, the reaction severity is increased by increasing the temperature so as to maintain a desired, substantially constant sulfur removal level. "End of run temperature" is typically about 800° F. and is reached when the catalyst activity has been significantly decreased, e.g., due to metals poisoning and coking. Were it not for such metals poisoning of the desulfurization catalyst, the operating cycles could be lengthened, or the severity could be reduced (lower temperatures and/or lower pressures and/or higher space velocities).

One of the great difficulties in the desulfurization of heavy oils such as residua is that the asphaltenic components contained in the resid are of a type that are difficult to desulfurize. In addition, the high metals content present in those alphaltenic structures acts as a contact solids poison which acts primarily by blocking up the pores near the external surface of the contact solids so that the internal surface becomes unavailable to carry out the desulfurization reaction; the life of the desulfurization contact solids is limited by metals deposition in the pore structure of the solids.

Although metallic contaminants, existing as oxide or sulfide scale may be removed, at least in part, by a relatively simple filtering technique, and the water soluble salts are at least part removable by washing in a subsequent dehydration procedure, a much more severe treatment is required to effect the destructive removal of the organo-metallic compounds. However, the higher molecular weight organo-metallic molecules in these feedstocks can only be broken down when operating under operating conditions more severe than needed for desulfurization, which also tend to accelerate catalyst dactivation due to accelerated coke and metal deposition on the catalyst surfaces.

Therefore, it has been suggested that metals removal prior to treatment of non-metallic impurities such as sulfur is indispensable. Simultaneous treatment of the hydrocarbon for removal of all these impurities withouth pretreatment for metals removal requires an amount of catalyst in large excess to the theoretical amount required for desulfurization. Because catalysts for these desulfurization operations are very expensive, inexpensive demetallation catalysts having excellent demetallation characteristics have been sought.

When demetallation treatment is carried out beforehand, hydrocarbons are treated by using either an ordinary or high porosity desulfurization catalyst or a waste catalyst having almost no desulfurization activity or by using bauxite, red mud and the like as the catalyst in a so-called guard reactor. All these catalysts, however, have defects in that either the activity of demetallation is low or the life of the catalyst is too short and, moreover, they are very unsatisfactory for the purpose of carrying out a selective and effective demetallation reaction.

In the case of a catalyst having a relatively high demetallation activity, the desulfurization reaction also proceeds simultaneously. The demetallation reaction, like the desulfurization reaction, is a hydrogenation reaction which is carried out in the presence of a catalyst under hydrogen pressure and at a high temperature. The demetallation reaction commonly takes place together with the desulfurization reaction since metals are deposited on the active catalyst sites during the desulfurization reaction. In desulfurization treaments using conventional desulfurization catalysts, the higher the desulfurization is raised, the higher the demetallation becomes. The desulfurization and demetallation reactions take place in an almost definite proportion under the same conditions. Even when demetallation is carried using the coventional desulfurization catalyst, it is totally impossible to avoid the desulfurization reaction which takes place in the definite proportion.

At the present time and certainly for several years into the foreseeable future, low sulfur fuel oils are and will be in critical demand. At the same time that recent legislation has reduced the allowable sulfur levels in fuel oils, the overall demand for fuel oils has increased markedly. As a consequence, the need for desulfurized petroleum products such as fuel oils has been doubly increased.

An object of this invention is to provide a method for the hydrodesulfurization of metals and sulfur containing petroleum oils, preferably those containing residua hydrocarbon fractions, whereby the operating cycle, that is, the number of days on stream, for such a process may be significantly increased without any significant decrease in sulfur removal. An additional object of this invention is to provide a method for hydrodesulfurizing petroleum oils, preferably those containing residua hydrocarbon fractions, whereby the severity of the operation and the attendant investment in operating costs are decreased. Another object of this invention is to provide a hydrodesulfurization method and catalyst whereby the metals poisoning of the desulfurization catalyst is significantly reduced. Other and additional objectives of this invention will become obvious to those skilled in the art following a consideration of the entire specification including the claims.

SUMMARY OF THE INVENTION

It has now been discovered that metals-poisoning of catalysts employed in the desulfurization of heavy oils such as residual oils can be reduced by coating the surfaces of conventional hydrodesulfurization catalysts with hydrated metal oxides, typically a hydrated clay mineral or hydrated alumina or silica.

As noted above, the desulfurization of residual oil (resid) to make fuel oil is usually accompanied by the removal of trace metals found in the resid. These metals, e.g., vanadium, nickel, iron, etc., deposit on the catalyst and cause a decline in desulfurization activity trough catalyst fouling. The deposition of these metals is of a catalytic nature and hence requires the presence of an active component. In hydrotreating processes, these active components are typically CoMo, NiMo, NiW, etc., dispersed on a porous alumina support. Any process which limits the accessability of the metals-containing reactants to the active sites would inhibit metals deposition. The invention achieves this effect by the addition of diffusion-limiting material to the catalyst particle exterior. Materials that can restrict the diffusion of the large, metals-containing molecules to the active sites are preferred. Most of the sulfur- and nitrogen-bearing molecules are of a smaller size and would be restricted to a much lesser extent.

While not wishing to be bound by any theory of operaability, it is believed that the diffusion inhibition is achieved by the surface deposition of particles too large to enter into the porous carrier. The coating will generally have a pore size smaller than that of the carrier. Thus, the coating surface becomes the diffusion limiting surface. Alternate diffusion limitation can be imparted where some of the coating solids are small enough to lodge in the openings of the porous carrier, thus obstructing the entrance of large, metal-containing molecules to the interior of the catalyst. However, the desired size of the residual pores of the coated catalyst is less than 100 Å.

Two methods of preparing the catalyst of the present invention are contemplated. The first method involves the coating of a desulfurization catalyst with a hydrated clay. When exposed to water, some clays swell and can be coated on the surface of the catalysts. Upon dehydration, they bind to the catalyst particles. Typical clays would include a Montmorillonite type, identified specifically as bentonite and kaolinite. The diffusion inhibition by the clay can be controlled by both the amount or type of clay coated and by the degree of consistency achieved.

An alternate method involves the coating of a desulfurization catalyst by dipping it in a suspension of hydrated alumina or silica. Upon drying, the alumina or silica deposits on the exterior of the catalyst particles. The pore size distribution of this additional oxide can further be controlled by acid peptization and calcination. It may be necessary to calcine and/or to presulfide the desulfurization catalyst prior to dipping in order to minimize migration of the ions of the active hydrogenation component.

Current resid desulfurization catalysts have no facility for resisting the deactivating effects resulting from the accumulation of trace metals from the resid. By the addition of a diffusion-limiting coating to the catalyst exterior, increased desulfurization selectivity relative to demetallation is attained and, accordingly, the catalyst has a greater facility for resisting the deactivating effects of metals. Use of the coated catalysts of this invention enables the production of low sulfur fuel oil from the residua of high metals crudes, such as Lagomedio, Cold Lake, Iranian Heavy, etc. The decreased metals accumulation can lengthen catalyst life, thereby reducing the process severity necessary to achieve a given level of sulfur removal, and lead to a subsequent decrease in operating costs. Alternately, equivalent process severity can result in increased catalyst life, yielding lower catalyst costs.

BRIEF DESCRIPTION OF THE DRAWING

The FIGURE is a plot showing the corresponding demetalation and desulfurization activities of a coated and an uncoated conventional hydrodesulfurization catalyst.

DETAILED DESCRIPTION OF THE INVENTION

The catalyst useful in this invention comprises a conventional desulfurization catalyst havng a coating or deposit of a hydrated material on its surface. Conventional desulfurization catalysts comprise a hydrogenation component composited with a support. Any of the well known particulate hydrosulfurization catalysts may be used to form the catalyst of this invention.

The hydrogenation component can be any known material or combination thereof effective to desulfurize the charge stock. The preferred and commonly used hydrogenation component comprises the oxides or sulfides of one or more metals of Groups VI, VII, and/or VIII and especially the oxides or sulfides of an iron group metal and a Group VI B metal. The iron group metals as used herein include iron, cobalt and nickel, of which cobalt and nickel are particularly preferred. The Group VI B metals include chromium, molybdenum and tungsten of which molybdenum and tungsten are particularly preferred. Suitable examples of catalysts of the preferred type comprise nickel-tungsten, nickel-molybdenum, cobalt-molybdenum, or nickel-cobalt-molybdenum.

The support is typically a porous refractory inorganic oxide of Groups II, III, or IV elements, or compositions of said inorganic oxides. The refractory inorganic oxide carrier material usually employed in the manufacture of hydrodesulfurization catalysts is alumina or alumina composited with another refractory inorganic oxide such as silica, zirconia, thoria, magnesia, titania, zinc oxide and the like.

Although the metal components may be present in any amount, the preferred catalysts composition contain the preferred combination of metals, computed as oxide and based on total weight of catalysts, in amounts of about 2 weight percent to about 6 weight percent cobalt oxide (CoO) or nickel oxide (NiO) and from about 8 weight percent to about 16 weight percent and molybdenum trioxide ($MoO_3$), the remainder being the alumina support. Compositing the hydrogenation component with the alumina may be done by any of the compositing techniques known in the art. The alumina support preferably is of the type prepared by the precipitation of aluminum solution and in particular should contain less than 0.5 weight percent silica.

Known compositing techniques for preparing supported desulfurization catalysts may be broadly described by four categories of catalysts. First, those formed by co-precipitating compounds of the active metals and the alumina or other carrier from the single solution in order to form a gel of the carrier material having the catalytic materials uniformly dispersed therein. Second, those formed by mixing and kneading aluminum hydroxide gel with acidic or ammonium aqueous solution containing salts of the hydrogenating metal. Third, those formed by impregnation techniques wherein the hydrogenating metal components are deposited (either simultaneously or separately) upon the carrier by dipping the carrier in a solution of the active material(s). Fourth, those formed by mechanically mixing the solid active components and the carrier and forming the mixture into pellets. As stated, any of these compositing methods may be employed to produce the catalyst of this invention.

The conventional desulfurization catalysts to be coated consist of recognizable particles, the particular form of which depends upon the type of reactor to be employed in the desulfurization process. The reactor types which may be employed include fixed bed reactors and ebullated or fluidized bed reactors. Thus, while the size and shape of the uncoated catalyst particles is not of utmost significance to the specific invention herein described, the size and shape of the uncoated desulfurization catalyst particles will be compatible with the desulfurization reactor in which it is to be employed.

Depending on the compositing method used to form the uncoated, conventional catalyst and in order to minimize the migration of ions of the hydrogenation component, it may be necessary to calcine and/or presulfide the desulfurization catalyst prior to applying the coating.

Material used as a catalyst coating is selected from the group consisting of hydrated clay, hydrated alumina, hydrated silica, and mixtures thereof. Preferred clays are of the montmorillonite type, especially bentonite and kaolinite. The diffusion inhibition of the coating may be controlled by means well known to those skilled in the art. For example, the diffusion inhibition of the clay can be controlled by both the amount or type of clay coated and by the degree of consistency achieved. The diffusion inhibition by the silica or alumina can be controlled by controlling the pore size distribution of these additional oxides by means such as acid peptization and calcination.

The coating can be applied to the conventional desulfurization catalysts by any of the known means such as spraying or immersion. After the coating has been applied to the support (which under some circumstances can be two or three different sprayings or immersions with the drying step interposed in between), the coated support is then air dryed and calcined or, if desired, it could be calcined immediately witout the intervening air drying step.

The coated hydrodesulfurization catalyst of this invention can be used in the same way as the prior art, uncoated hydrodesulfurization catalysts.

The feedstock to be desulfurized can be any metal contaminant containing petroleum stock, preferably one containing residual fractions. The feedstock can be whole crude. However, since the high metal and sulfur components of the crude oil tend to be concentrated in a higher boiling fractions, the present process will more commonly be applied to a bottoms fraction of a petroleum oil, i.e., one which is obtained by atmospheric distillation of a crude petroleum oil to remove lower boiling materials such as naphtha and furnace oil or by vacuum distillation of an atmospheric residue to remove gas oil. Typical residues to which the present application is applicable will normally be substantially composed of residual hydrocarbons boiling about 650° F. and containing a substantial quantity of asphaltic materials. Thus, the charge stock can be one having a initial or 5% boiling point somewhat below 650° F., provided that a substantial proportion, for example, about 70% or 80% by volume, of its hydrocarbon components boil above 650° F. The hydrocarbon stock having a 50% boiling point of about 900° F. and which contains asphaltic materials, 4% by weight sulfur and 50 parts per million nickel and vanadium is illustrative of such charge stock. Typical process conditions may be defined as contacting a metal or sulfur contaminant containing charge stock with the coated hydrodesulfurization catalyst under a hydrogen pressure of about 500-3000 psig, of 650°-850° F. temperature, and 0.1 to 5 LHSV.

The hydrogen gas which is used during the hydrodesulfurization is circulated at a rate between about 1000 and 15,000 scf per barrel of feed and preferably between about 3000 and 8000 scf per barrel. The hydrogen purity may vary from about 60 to 100%. If the hydrogen is recycled, which is customary, it may be desirable to provide for bleeding off a portion of the recycled gas. Makeup hydrogen is added since hydrogen is consumed during the process. The recycled gas can be washed with a chemical absorbent for hydrogen sulfide or otherwise treated in a known manner to reduce the hydrogen sulfide content thereof prior to recycling.

In the application of hydrodesulfurization to whole crudes and residues, objectives have ranged from processing with minor hydrocracking to obtain a salable product or one more amenable to subsequent refining to processing to obtain virtually complete elimination of higher boiling components with the production of a major amount of gasoline. The hydrodesulfurization process of this invention is particularly useful for mild hydrodesulfurization of resids to produce marketable heavy fuel oils.

It is known that the relative size of the "neck" of the pore has a very great effect upon desulfurization catalyst activity and aging characteristics when treating a residual oil comprising metal-containing molecules, which are concentrated in the asphaltene and resin fractions of the crude and are the highest boiling materials in the crude oil. Since the metal-containing molecules tend to be the largest molecules in a petroleum oil, a relatively small pore orifice size tends to be a barrier or sieve preventing the admission of these large molecules to the interior of the catalyst pores. In the hydrodesulfurization reaction, most of the reaction occurs within the pores of the catalyst. On the one hand, if the metal-containing molecules are permitted easy access to the interior of the pores, there is a high laydown of vanadium and nickel contaminants upon the pore walls and the catalyst tends to become deactivated. On the other hand, if the pore orifice is small, it can serve as a membrane or a sieve, barring access of the very large metal-containing molecules to the interior of the pore of the catalyst, enabling the pore surface to contain high catalyst desulfurization activity for a prolonged throughput duration.

For this reason, a small pore opening will tend to maintain high surface activity within the body of the pore by preventing access to the pores of the larger size metal-containing molecules. However, a correlative disadvantage in terms of decreased catalyst life occurs in the case of the catalyst whose pores have a small orifice. This disadvantage arises when the metal-containing molecules which are barred from access to the body of the pore react sufficiently within the pore opening near the outer catalyst surface to deposit metals within the pore opening and thereby abruptly and substantially close off the already restricted opening. When the pore opening becomes blocked the life of the catalyst is substantially terminated because the smaller sulfur-containing molecules are then prevented access to the body of the pore, even though the surface of the body of the pore is still highly active.

While not wishing to be bound by any theory of operability, it is believed that by providing a hydrous metal oxide, exterior coating on active desulfurization catalysts, the advantage of small orifice size may be obtained and at the same time the correlative disadvantage of pore blockage avoided. By limiting access of the metals containing molecules to the active hydrogenation sites, the effect of the coating on any given desulfurization catalyst is then to decrease its demetallation activity while maintaining the desirable desulfurization activity. This effect is shown by the following examples.

The following examples show preparations of the coated catalyst of this invention.

EXAMPLE A

A Bentonite-coated catalyst was prepared by dispersing 2.375 grams of raw Bentonite, having a solids content at 1000° F. of 80 wt.%, in 86.7 grams of water. This dispersion was held at 180° F. for 24 hours. To the resulting hydrated clay slurry was added 95 grams of a commercial resid hydrodesulfurization catalyst (HDS-1441). The coating was allowed to adsorb on the surface of the catalyst for 6 hours and was then dried at 230° F., followed by calcination at 1000° F. for 10 hours. The added Bentonite coating constituted 2 wt.% of the final catalyst composition.

EXAMPLE B

In like manner a catalyst is prepared by hydrating a raw kaolin clay in water and is contacted with another batch of the cobalt-moly-hydrodesulfurization catalyst to deposit 2 wt.% kaolin clay coating on the surface.

EXAMPLE C

An alternate type of catalyst is prepared where the equivalent amount of alumina, an alpha alumina monohydrate, is hydrated in presence of water at 180° F. and then coated on the surface of a portion of the same cobalt-moly-hydrodesulfurization catalyst.

EXAMPLE D

Here the alternate alumina coated catalyst is prepared by hydrating the alumina in presence of nitric acid which is equal to 2 wt.% of the coating alumina.

EXAMPLE E

This example describes another variant in the preparation of coated catalyst. Here the coating silica is prepared by ball milling the siliceous hydrogel with water first for 24 hours and then removing the stones and milling the resulting sol and the cobalt-moly-hydrodesulfurization together for several hours.

EXAMPLE F

A silica coated catalyst is also prepared by first peptizing a silica hydrogel by heating the hydrogel in presence of NH$_4$OH for a 24 hour period. The resulting silica sol is diluted in water and then used to coat the hydrodesulfurization catalyst.

EXAMPLES 1-7

Table I shows the properties of a commercial resid hydrodesulfurization catalyst (HDS-1441) and the same catalyst with a two weight percent coating of bentonite (Example A, supra). The addition of the bentonite as shown in the table, causes little if any change in the total pore volume in surface area of the catalyst.

Table II shows the activity of the two weight percent bentonite coated catalyst for hydrotreating an Arabian Light vacuum resid. Material balances have been included at 1500, 2000, and 2200 psig. The percents demetalation and desulfurization are shown, corrected to 0.25 LHSV.

These activities are plotted in the FIGURE, in which the demetalation vs. desulfurization selectivity of the uncoated catalyst is included. As shown in the FIGURE, at the same desulfurization level, the bentonite coated catalyst removed 15 to 20% less metals than did the uncoated catalyst.

TABLE I

| Catalyst Properties | HDS-1441 | Example A (HDS-1441. + 2% Bentonite) |
|---|---|---|
| CoO, wt % | 3.4 | |
| MoO₃, wt. % | 13.4 | |
| NiO, wt. % | | |
| SiO₂, wt. % | 4.91 | |
| Real density | 3.42 | 3.822 |
| Particle density | 1.26 | 1.256 |
| Surface area, m²/g | 286 | 293 |
| Pore volume, cc/g | 0.491 | .535 |
| Pore Size Distribution, vol. % | | |
| 0/30 Å | 4 | |
| 30/50 Å | 13 | |
| 50/80 Å | 80 | |
| 80/100 Å | 1 | |
| 100/150 Å | 1 | |
| 150/200 Å | 0 | |
| 200/300 Å | 0 | |

TABLE I-continued

| Catalyst Properties | HDS-1441 | Example A (HDS-1441. + 2% Bentonite) |
|---|---|---|
| 300+ Å | 1 | |

TABLE II

Hydrotreating of Arab Lt. Vacuum Resid with Bentonite-Coated Catalyst

| | Charge | Example 1 | 2 | 3 | 4 | 5 | 6 | 7 |
|---|---|---|---|---|---|---|---|---|
| Balance Conditions | | | | | | | | |
| T, °F. | | 673 | 724 | 776 | 675 | 726 | 776 | 725 |
| P, PSIG | | 2000 | → | → | 2200 | → | → | 1500 |
| LHSV, Vo/Vcat-Hr | | .273 | .264 | .283 | .254 | .272 | .253 | .288 |
| H CIRCULATION, SCF/B | | 5210 | 4748 | 4318 | 6687 | 5381 | 5388 | 4112 |
| Days on Stream | | 1.0 | 2.1 | 3.0 | 4.1 | 5.1 | 6.1 | 7.9 |
| Yields | | | | | | | | |
| C₁–C₃, wt. % | | .27 | .81 | 2.42 | .29 | .74 | 2.14 | .65 |
| C₄, wt. % | | .13 | .36 | 1.25 | .16 | .38 | 1.08 | .20 |
| C₅+, wt. % | | 97.51 | 96.37 | 93.92 | 97.47 | 96.84 | 95.13 | 96.86 |
| 1000° F.+, vol % (M1122) | 86.32 | 69.03 | 58.98 | 29.26 | 72.86 | 61.54 | 29.35 | 63.94 |
| H CONSUMPTION, SCF/B | | 768 | 817 | 1121 | 758 | 979 | 1662 | 785 |
| Total Liqund Product | | | | | | | | |
| °API | 8.3 | 17.6 | 20.8 | 27.7 | 16.3 | 21.2 | 28.1 | 18.5 |
| H, wt. % | 10.67 | 11.82 | 11.84 | 12.09 | 11.81 | 12.08 | 12.88 | 11.82 |
| S, wt. % | 3.93 | 1.05 | 0.66 | 0.32 | 1.02 | 0.69 | 0.256 | 0.82 |
| N, wt. % | .28 | .16 | .13 | .09 | .22 | .26 | .11 | .18 |
| CCR, wt. % | 16.13 | 9.59 | 5.94 | 3.13 | 9.20 | 6.53 | 2.51 | 7.71 |
| V, ppm | 68 | 34.0 | 30.0 | 14.0 | 41.0 | 30.0 | 13.9 | 37.0 |
| Ni, ppm | 17 | 12.0 | 9.1 | 4.8 | 12.0 | 9.4 | 4.8 | 12.0 |
| Catalyst Performance Corrected to LHSV + 25 | | | | | | | | |
| % desulfurization | | 75.1 | 84.3 | 92.9 | 74.9 | 83.8 | 93.8 | 81.3 |
| % demetalation | | 49.2 | 57.0 | 81.8 | 39.5 | 57.1 | 79.3 | 47.3 |

What is claimed is:

1. In a process for hydrodesulfurizing a petroleum oil that contains residual hydrocarbon components including metal wherein said oil and hydrogen are contacted with a hydrodesulfurization catalyst at a space velocity of about 0.1 to 5.0 LHSV, a pressure of about 500 to 3000 psig, and a hydrogen circulation rate of about 1000 to 15,000 scf per barrel and at a temperature of about 650° to 850° F., the improvement which comprises contacting said oil and hydrogen with a hydrodesulfurization catalyst comprising particulate refractory porous iorganic oxide, carrier material and a hydrogenation component, said catalyst having a diffusion limiting coating formed from a material selected from the group consisting of hydrated clays, hydrated silica, hydrated alumina and mixtures thereof on the catalyst particle exterior surfaces.

2. A process in accordance with claim 1 wherein the said catalyst surface coating is formed from a hydrated montmorrillonite clay.

3. A process in accordance with claim 2 wherein said clay is bentonite.

4. A process in accordance with claim 2 wherein said clay is kaolinite.

5. A process in accordance with claim 1 wherein said catalyst surface coating is formed from a hydrated silica.

6. A process in accordance with claim 1 wherein said catalyst surface coating is formed from a hydrated alumina.

7. A process in accordance with claim 1 wherein said catalyst coating is from about 0.1 to 10 weight percent of the total catalyst.

* * * * *